United States Patent
Uchida et al.

(10) Patent No.: US 9,851,844 B2
(45) Date of Patent: Dec. 26, 2017

(54) TOUCH PANEL DEVICE

(71) Applicant: OLYMPUS CORPORATION, Hachioji-shi, Tokyo (JP)

(72) Inventors: Taiji Uchida, Tokyo (JP); Hiroyuki Ushifusa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/477,515

(22) Filed: Apr. 3, 2017

(65) Prior Publication Data

US 2017/0205949 A1 Jul. 20, 2017

Related U.S. Application Data

(63) Continuation of application No. PCT/JP2016/060190, filed on Mar. 29, 2016.

(30) Foreign Application Priority Data

Apr. 15, 2015 (JP) .................................. 2015-082954

(51) Int. Cl.
  *G06F 3/041* (2006.01)
  *G06F 3/044* (2006.01)
  *G06F 3/0488* (2013.01)
  *G06F 3/0484* (2013.01)
  *G06F 3/0489* (2013.01)

(52) U.S. Cl.
  CPC ............ *G06F 3/0416* (2013.01); *G06F 3/044* (2013.01); *G06F 3/0484* (2013.01); *G06F 3/04886* (2013.01); *G06F 3/04897* (2013.01); *G06F 2203/04103* (2013.01)

(58) Field of Classification Search
  CPC ............... G06F 3/0416; G06F 3/04897; G06F 3/04886; G06F 3/044; G06F 3/0484; G06F 2203/04103
  See application file for complete search history.

(56) References Cited

U.S. PATENT DOCUMENTS

2014/0049678 A1 2/2014 Tanaka
2014/0192244 A1 7/2014 Ishihara et al.

FOREIGN PATENT DOCUMENTS

| JP | 2008-146201 A | 6/2008 |
| JP | 2009-037343 A | 2/2009 |
| JP | 2012-231276 A | 11/2012 |
| JP | 2013-178794 A | 9/2013 |
| JP | 2013-180079 A | 9/2013 |
| JP | 2014-52778 A | 3/2014 |

(Continued)

OTHER PUBLICATIONS

Jun. 14, 2016 Search Report issued in International Patent Application No. PCT/JP2016/060190.

(Continued)

*Primary Examiner* — Jonathan Boyd
(74) *Attorney, Agent, or Firm* — Oliff PLC (57) ABSTRACT

A touch panel device includes a capacitive touch panel; a manipulation detector that detects a manipulation performed on a manipulation detection area on the touch panel, on the basis of a change in the capacitance of the touch panel; and a manipulation valid area setting unit that sets, in the manipulation detection area, a manipulation valid area in which a manipulation detected by the manipulation detector is determined to be valid.

6 Claims, 6 Drawing Sheets (56) References Cited

FOREIGN PATENT DOCUMENTS

| | | |
|---|---|---|
| WO | 2012/147521 A1 | 11/2012 |
| WO | 2013/051259 A1 | 4/2013 |

OTHER PUBLICATIONS

Jun. 14, 2016 Written Opinion issued in International Patent Application No. PCT/JP2016/060190.
Dec. 27, 2016 Decision to Grant issued in Japanese Patent Application No. 2016-564651.

TOUCH PANEL DEVICE

CROSS-REFERENCE TO RELATED APPLICATIONS

This application is based upon and claims the benefit of priority of the prior Japanese Patent Application No. 2015-082954, filed Apr. 15, 2015, the entire contents of which are incorporated herein by reference.
This is a Continuation Application of PCT Application No. PCT/JP2016/060190, filed Mar. 29, 2016, which was not published under PCT Article 21(2) in English.

FIELD

The present invention relates to a touch panel device.

BACKGROUND

Touch panel devices have a display function and an input function, and superior intuitive operability. Thus, in recent years, they have been used as an input device (or a manipulation device) for a variety of electronic equipment such as ATMs (automated teller machines) for financial institutions, portable digital assistants (such as a tablet PC (personal computer) and a smartphone), or medical equipment.

With respect to a touch panel of a touch panel device, there exist touch panels of various detection schemes according to the principle of operation, such as a resistive touch panel, a capacitive touch panel, a surface acoustic wave touch panel, an optical touch panel (an infrared optical imaging touch panel), and an electromagnetic sensing touch panel. Thus, with respect to a touch panel of a touch panel device used as an input device for electronic equipment, a touch panel of a most suitable detection scheme is selected according to, for example, the application, the environment, and the specifications. However, each detection scheme has both strong and weak points, and there exists no detection schemes that have an advantage in every aspect.

For example, a capacitive touch panel has the advantage of high transmission and great durability.

A touch panel is known that is used in a processor of an endoscopic device as an input device of medical equipment (see, for example, Japanese Laid-open Patent Publication No. 2009-37343). For example, the following operation is performed in this touch panel device: when a first display button is pressed down, a processor control circuit that received a signal indicating a pressed position calculates an amount of shift from a center point of the first display button to the pressed position; an area that can react is extended on the basis of the amount of shift, the area being set for the first display button; and before the time period that has elapsed since the first display button was pressed down last time reaches a predetermined upper limit time period, a second display button is pressed down in order to cancel out a function to be executed by the first display button being pressed down, and the extended reaction area is restored to a reference area that is an original reaction area.

SUMMARY

An aspect of the present invention provides a touch panel device that includes: a housing device that includes a front panel provided in a standing position so as to be substantially perpendicular to a floor; a capacitive touch panel that is provided on the front panel; a manipulation detector that detects a manipulation performed on a manipulation detection area on the touch panel, on the basis of a change in the capacitance of the touch panel; and a manipulation valid area setting unit that sets an area other than a margin on the side of the floor in the manipulation detection area to be a manipulation valid area in which a manipulation detected by the manipulation detector is determined to be valid.

DESCRIPTION OF EMBODIMENTS

Embodiments of the present invention will now be described with reference to the drawings.

Figure 1:
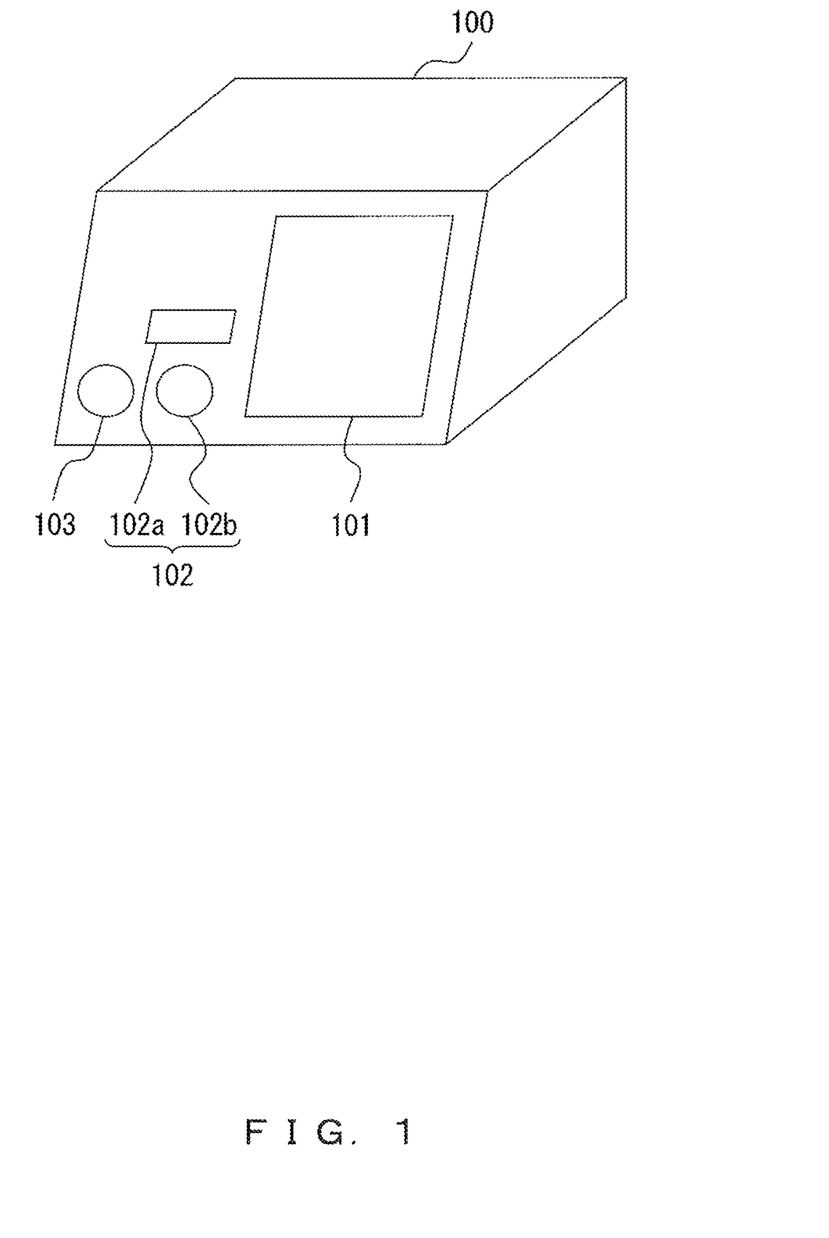
FIG. 1 illustrates an example of an outward configuration of an endoscopic processor that is electronic equipment that includes a touch panel device according to an embodiment of the present invention.

Electronic equipment that includes a touch panel device according to an embodiment of the present invention is an endoscopic processor. FIG. 1 illustrates an example of an outward configuration of the endoscopic processor.

As illustrated in FIG. 1, an endoscopic processor 100 is an apparatus that has a housing form having a slightly inclined front panel on its front surface, and the front panel is provided with, for example, an LCD (liquid crystal display) with touch panel 101, a scope connector 102 (102a, 102b), and a power button 103.

The LCD with touch panel 101 serves as an input device (or a manipulation device) of the endoscopic processor 100, and receives various inputs from a user due to, for example, a touch manipulation or a release manipulation being performed by the user, the release manipulation being a manipulation to release the touch manipulation. The touch manipulation performed by a user is, for example, a manipulation of a user's touching the LCD with touch panel 101 with a finger, and the release manipulation performed by the user is, for example, a manipulation of user's leaving his/her finger with which the LCD with touch panel 101 has been touched.

The scope connector 102 is a connector for an endoscope to which an endoscope described later is connected. Specifically, a scope connector 102a is a connector to which a cable (including a signal line that transmits a video signal) of an endoscope is connected, and a scope connector 102b is a connector to which a light guide described later in the endoscope is connected.

The power button 103 is a button that powers on and off the endoscopic processor 100. The endoscopic processor 100 further includes, for example, a connector for a monitor (not illustrated) to which a monitor described later is connected.

The endoscopic processor 100 having the outward configuration described above is used as part of the following endoscopic system in a medical institution such as a hospital.

Figure 2:
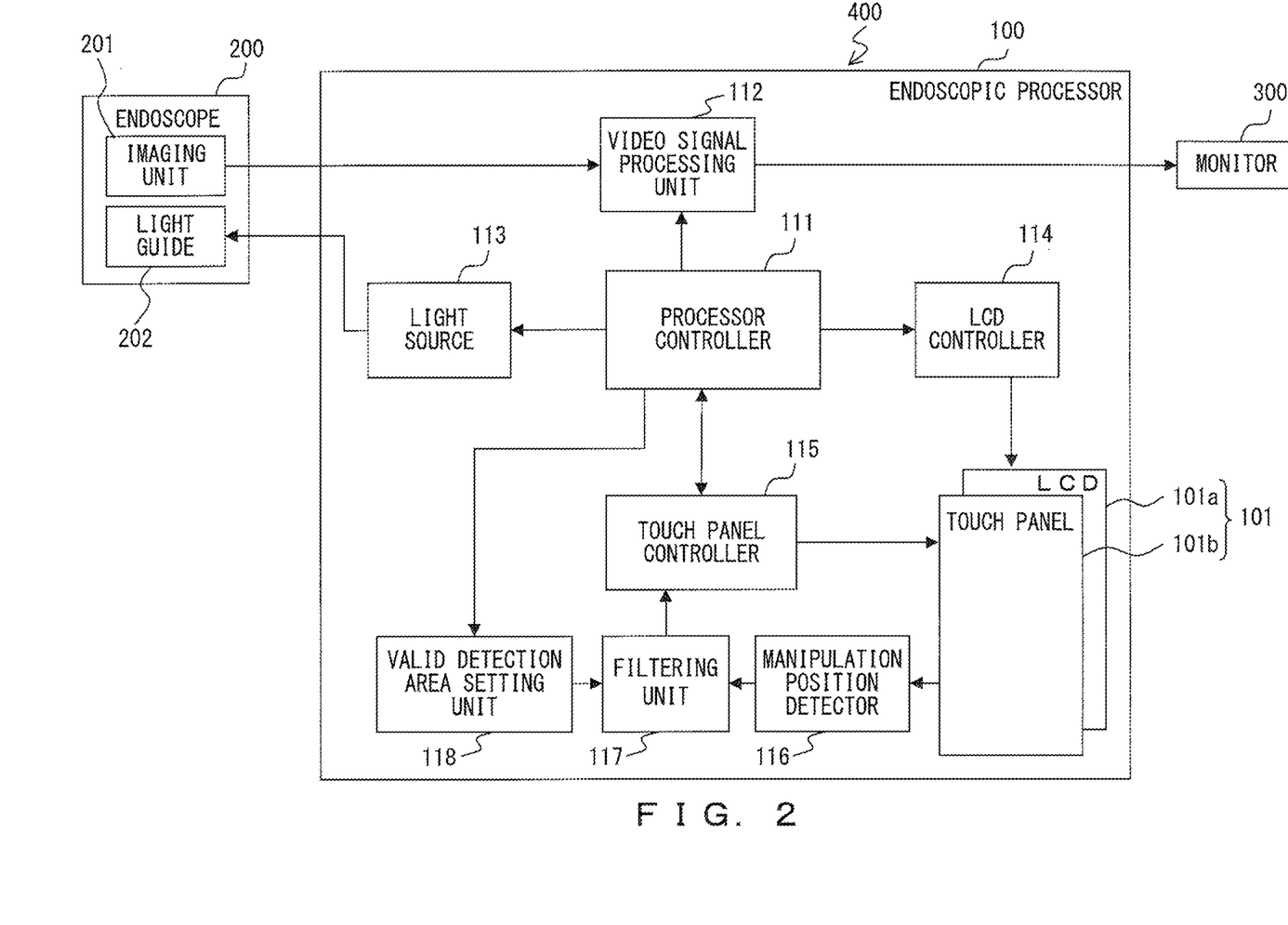
FIG. 2 illustrates an example of a configuration of an endoscopic system that includes the endoscopic processor.

FIG. 2 illustrates an example of a configuration of an endoscopic system that includes the endoscopic processor 100.

As illustrated in FIG. 2, an endoscopic system 400 includes the endoscopic processor 100, an endoscope 200, and a monitor 300. Further, the endoscopic system 400 has a configuration in which the endoscope 200 and the endoscopic processor 100 are connected through the scope connector 102 described above and the endoscopic processor 100 and the monitor 300 are connected through the connector for a monitor described above.

The endoscope 200 includes an imaging unit 201 and a light guide 202.

The imaging unit 201 includes an imaging element (not illustrated) such as a CCD (charge-coupled device) or a CMOS (complementary metal oxide semiconductor). The imaging unit 201 captures an optical image of a subject using the imaging element and outputs a video signal corresponding to the optical image to the endoscopic processor 100.

The light guide 202 guides illumination light input from the endoscopic processor 100 to an endoscope tip. The illumination light guided to the endoscope tip in this way is illuminated onto the subject by an optical system (not illustrated) that is provided in the endoscope tip.

The endoscopic processor 100 includes the LCD with touch panel 101 (101a, 101b), a processor controller 111, a video signal processing unit 112, a light source 113, an LCD controller 114, a touch panel controller 115, a manipulation position detector 116, a filtering unit 117, and a valid detection area setting unit 118.

The LCD with touch panel 101 includes an LCD 101a and a touch panel 101b and has a configuration in which the touch panel 101b is arranged on the LCD 101a. The LCD 101a displays an image including, for example, a button or an icon under the control of the LCD controller 114. The touch panel 101b is a capacitive touch panel and is controlled by the touch panel controller 115.

Under the control of the endoscopic processor 100, the video signal processing unit 112 processes a video signal input from the imaging unit 201 of the endoscope 200 through the scope connector 102a, and outputs the processed video signal to the monitor 300 through the connector for monitor.

Under the control of the endoscopic processor 100, the light source 113 emits the illumination light to be illuminated onto the subject to the light guide 202 in the endoscope 200 through the scope connector 102b. The light source 113 includes LEDs (light emitting diodes) of R (red), G (green), and B (blue) as a light source, and emits white light obtained by combining pieces of light emitted from the respective LEDs.

The LCD controller 114 controls the LCD 101a under the control of the endoscopic processor 100.

The touch panel controller 115 controls the touch panel 101b under the control of the endoscopic processor 100. Further, the touch panel controller 115 outputs a position coordinate of a user manipulation described later to the processor controller 111, the position coordinate being input from the filtering unit 117.

On the basis of a change in the capacitance of the touch panel 101b, the manipulation position detector 116 detects a manipulation performed by the user on a manipulation detection area on the touch panel 101b, and detects a coordinate of a position, in the manipulation detection area, at which the manipulation has been detected. For example, on the basis of a change in the capacitance of the touch panel 101b, the manipulation position detector 116 detects a touch manipulation performed by the user on the manipulation detection area on the touch panel 101b, and detects a coordinate of a position, in the manipulation detection area, at which the touch manipulation has been detected. Further, for example, on the basis of a change in the capacitance of the touch panel 101b, the manipulation position detector 116 detects a release manipulation that is a manipulation to release the touch manipulation performed by the user on the manipulation detection area on the touch panel 101b, and detects a coordinate of a position, in the manipulation detection area, at which the release manipulation has been detected.

When the position coordinate of the manipulation detected by the manipulation position detector 116 is included in a valid detection area set by the valid detection area setting unit 118, the filtering unit 117 determines that the position coordinate of the manipulation is valid and outputs the position coordinate to the touch panel controller 115. On the other hand, when the position coordinate of the manipulation detected by the manipulation position detector 116 is not included in the valid detection area, the filtering unit 117 determines that the position coordinate of the manipulation is invalid and does not output the position coordinate to the touch panel controller 115. When the valid detection area has not been set by the valid detection area setting unit 118 (or when the entirety of the manipulation detection area has been set as a valid detection area), the filtering unit 117 just outputs the position coordinate of the manipulation detected by the manipulation position detector 116 to the touch panel controller 115.

Under the control of the processor controller 111, the valid detection area setting unit 118 sets a valid detection area in the manipulation detection area on the touch panel 101b, as illustrated using FIG. 3 described later. Here, the valid detection area is an area in which a manipulation detected by the manipulation position detector 116 is determined to be valid. The setting of a valid detection area which is performed by the valid detection area setting unit 118 may be performed according to the manipulation performed by the user on the touch panel with LCD 101, or it may be performed, for example, when the endoscopic processor 100 is shipped from a factory.

The processor controller 111 controls each component of the endoscopic processor 100. For example, when the position coordinate of a touch manipulation input from the touch panel controller 115 and the position coordinate of a release manipulation that is a manipulation to release the touch manipulation are included in an area, in the manipulation detection area, that corresponds to the same icon displayed on the LCD 101*a*, the processor controller 111 performs a control that causes an operation corresponding to the icon to be performed.

In the endoscopic processor 100 having the configuration described above, the touch panel 101*b* is an example of a capacitive touch panel. The manipulation position detector 116 is an example of a manipulation detector that detects a manipulation performed on a manipulation detection area on a touch panel, on the basis of a change in the capacitance of the touch panel. The manipulation position detector 116 is also an example of a touch coordinate detector and a release coordinate detector, wherein the touch manipulation detector detects, on the basis of a change in the capacitance of a touch panel, a touch manipulation performed on a manipulation detection area and detects a coordinate of a position, in the manipulation detection area, at which the touch manipulation has been detected, and the release coordinate detector detects, on the basis of a change in the capacitance of the touch panel, a release manipulation that is a manipulation to release the touch manipulation performed on the manipulation detection area and detects a coordinate of a position, in the manipulation detection area, at which the release manipulation has been detected. The valid detection area setting unit 118 is an example of a manipulation valid area setting unit that sets, in the manipulation detection area, a manipulation valid area in which a manipulation detected by the manipulation detector is determined to be valid.

The monitor 300 is, for example, an LCD, and displays a video corresponding to a video signal input from the endoscopic processor 100.

In the endoscopic system 400 having the configuration described above, the endoscopic processor 100 and the light source 113 may be configured to be one device as illustrated in FIG. 2, or they may be configured independently of each other. In the latter case, the light source 113 may be configured to be provided as a different device than the endoscopic processor 100.

The endoscope 200 and the endoscopic processor 100 may be configured to be one device, or the endoscope 200, the endoscopic processor 100, and the monitor 300 may be configured to be one device. In these cases, the LCD with touch panel 101 may be provided in a user manipulation unit (a user holding portion) of the one device.

The endoscope 200 may be, for example, a camera head that is connected to a flexible endoscope, a rigid endoscope, or an optical endoscope (such as a fiberscope or an optical scope for surgery).

The light source 113 may include a semiconductor light source or a lamp source as a light source. Here, the semiconductor light source may be LEDs of the respective colors of R, G, and B as described above, or a white LED that emits white light, or a laser diode. Alternatively, for example, when the endoscope 200 and the endoscopic processor 100 (or the endoscope 200, the endoscopic processor 100, and the monitor 300) are configured to be one device as described above, the configuration may be made such that the light source 113 that includes a semiconductor light source is provided in an endoscope tip.

Furthermore, the configuration may be made such that the transmission and reception of a signal between the endoscope 200 and the endoscopic processor 100 is performed over a wire as described above, or wirelessly.

The monitor 300 may be configured to be external to the endoscopic processor 100 as described above, or to be built in within the endoscopic processor 100.

Figure 3:
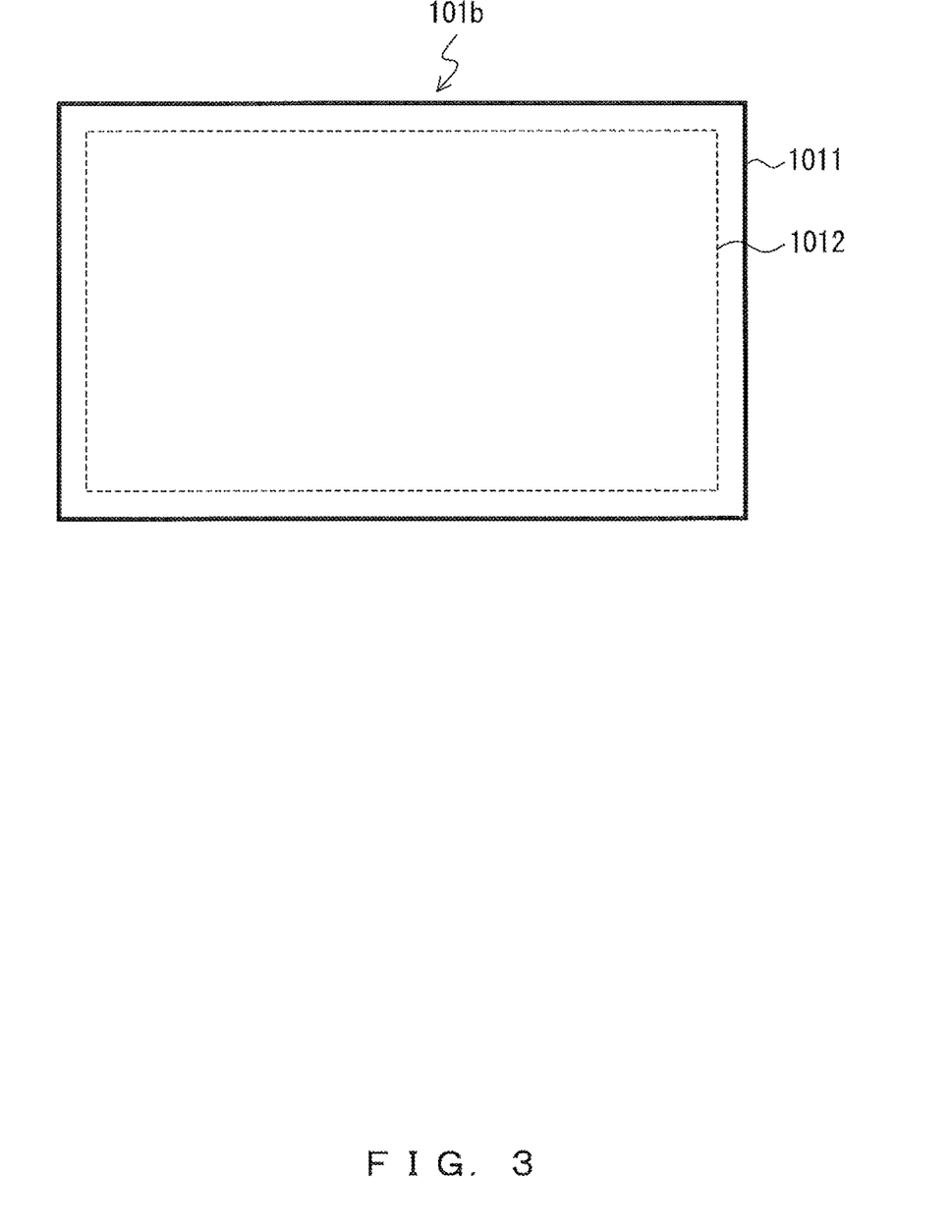
FIG. 3 illustrates an example of a valid detection area set by a valid detection area setting unit in a manipulation detection area on a touch panel.

FIG. 3 illustrates an example of a valid detection area set by the valid detection area setting unit 118 in the manipulation detection area on the touch panel 101*b*.

As illustrated in FIG. 3, in this example, a valid detection area (an area surrounded by a dotted line) 1012 is set by the valid detection area setting unit 118 in a manipulation detection area (an area surrounded by a solid line) 1011 on the touch panel 101*b*. This is an example in which an area other than a marginal area (an area between the solid line and the dotted line) in the manipulation detection area 1011 is set to be the valid detection area 1012. Further, this is also an example in which the valid detection area 1012 is set such that a release manipulation whose position coordinate is detected by the manipulation position detector 116 is determined to be invalid when the position coordinate of the release manipulation is included in the marginal area of the manipulation detection area 1011.

According to this example, when a position coordinate of a manipulation that is detected by the manipulation position detector 116 is included in the valid detection area 1012, the position coordinate of the manipulation is determined to be valid. On the other hand, when a position coordinate of a manipulation that is detected by the manipulation position detector 116 is not included in the valid detection area 1012 (when the position coordinate of the manipulation is included in a marginal area in the manipulation detection area 1011), the position coordinate of the manipulation is determined to be invalid.

In the endoscopic processor 100, the valid detection area 1012 is set in the manipulation detection area 1011 on the touch panel 101*b*, so as to prevent the endoscopic processor 100 from operating erroneously due to an erroneous detection that may occur due to a drop such as a water drop that has adhered unexpectedly to the capacitive touch panel 101*b* (at least a liquid drop that changes the capacitance of the touch panel 101*b*). The operation of the endoscopic processor 100 for such a prevention is described in detail using FIGS. 4A and 4B.

Figure 4A:
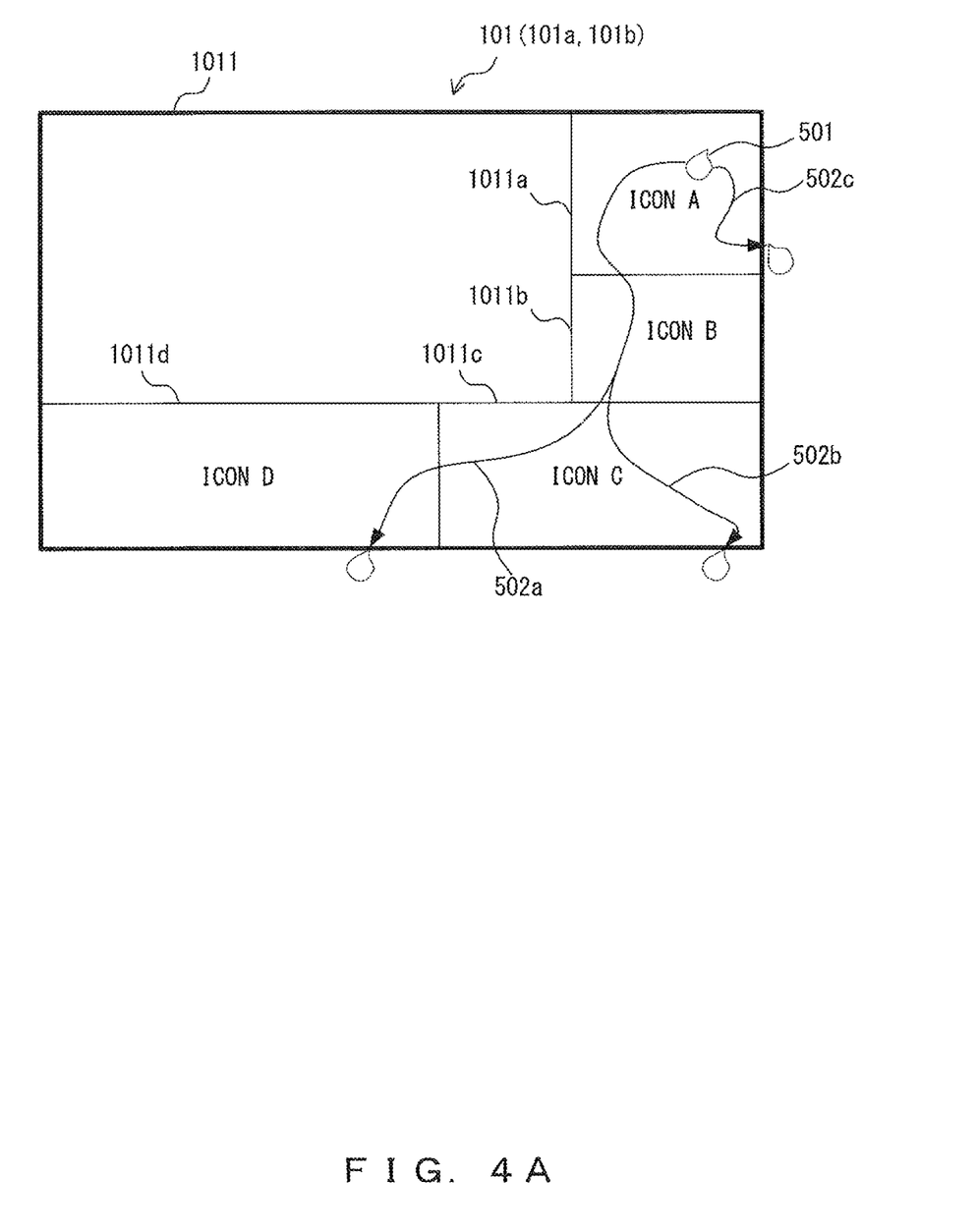
FIG. 4A illustrates an example of a route of a water drop when the water drop flows down the touch panel in an LCD with a touch panel, the water drop having adhered unexpectedly to the touch panel in a state in which the valid detection area has not been set in the manipulation detection area.
Figure 4B:
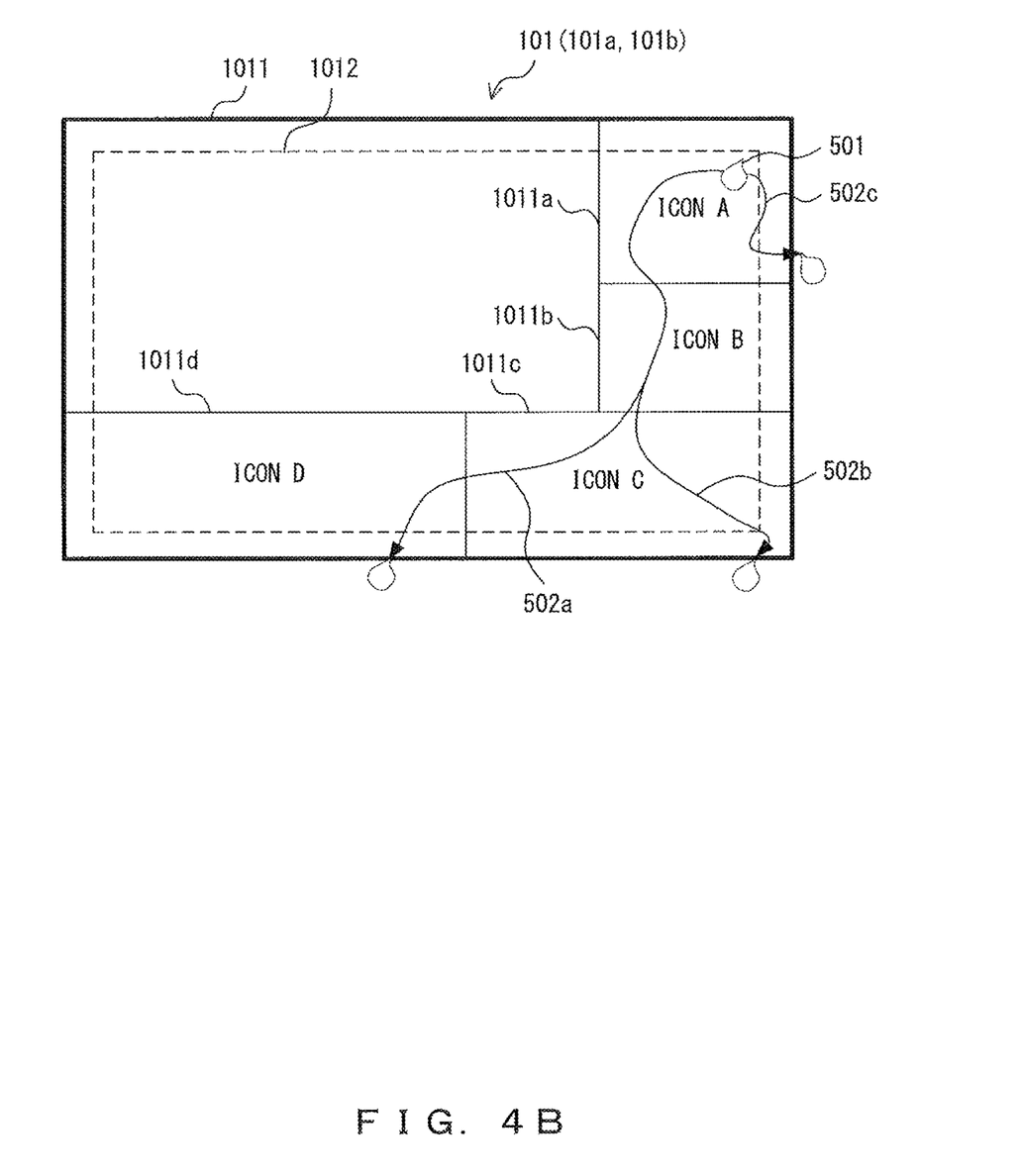
FIG. 4B illustrates an example of the route of the water drop when the water drop flows down the touch panel in the LCD with touch panel, the water drop having adhered unexpectedly to the touch panel in a state in which the valid detection area has been set in the manipulation detection area.

FIG. 4A illustrates an example of a route of a water drop when the water drop flows down the touch panel 101*b* in the LCD with touch panel 101, the water drop having adhered unexpectedly to the touch panel 101*b* in a state in which a valid detection area has not been set in the manipulation detection area 1011. FIG. 4B illustrates an example of the route of the water drop when the water drop flows down the touch panel 101*b* in the LCD with touch panel 101, the water drop having adhered unexpectedly to the touch panel 101*b* in a state in which the valid detection area 1012 has been set in the manipulation detection area 1011.

The routes of a water drop 501 illustrated in both of FIGS. 4A and 4B are the same.

Further, the images illustrated in both of FIGS. 4A and 4B are also the same, each image (including an icon A, an icon B, an icon C, and an icon D) being displayed on the LCD 101*a*. An area in the manipulation detection area 1011 that corresponds to a displayed icon is hereinafter referred to as an icon area. Specifically, an area 1011*a* in the manipulation detection area 1011 that corresponds to the displayed icon A is referred to as an icon A area, and an area 1011*b* in the manipulation detection area 1011 that corresponds to the displayed icon B is referred to as an icon B area. An area 1011*c* in the manipulation detection area 1011 that corresponds to the displayed icon C is referred to as an icon C area, and an area 1011*d* in the manipulation detection area 1011 that corresponds to the displayed icon D is referred to as an icon D area.

In FIGS. 4A and 4B, a route 502a of the water drop 501 indicates a route on which a water drop that has adhered unexpectedly to the icon A area 1011a flows down from the icon A area 1011a to the outside of the manipulation detection area 1011 through the icon B area 1011b, the icon C area 1011c, and the icon D area 1011d. A route 502b of the water drop 501 indicates a route on which the water drop that has adhered unexpectedly to the icon A area 1011a flows down from the icon A area 1011a to the outside of the manipulation detection area 1011 through the icon B area 1011b and the icon C area 1011c. A route 502c of the water drop 501 indicates a route on which the water drop that has adhered unexpectedly to the icon A area 1011a flows down from the icon A area 1011a to the outside of the manipulation detection area 1011.

First, the operation of the endoscopic processor 100 when a valid detection area has not been set in the manipulation detection area 1011 is described using FIG. 4A. The operation in this case is similar to the operation of a conventional endoscopic processor.

In the case in which the water drop 501 flows down as indicated by the route 502a illustrated in FIG. 4A, first, when the water drop 501 has adhered to the icon A area 1011a, a touch manipulation is detected (detected erroneously) and a position coordinate of the touch manipulation is detected in the manipulation position detector 116, and the position coordinate is input to the processor controller 111, the touch manipulation being detected (detected erroneously) on the basis of a change in the capacitance of the touch panel 101b due to the adhered water drop 501. After that, during the water drop 501 flowing down from the icon A area 1011a to the icon D area 1011d, the following processing is performed repeatedly: a touch manipulation is detected (detected erroneously) and a position coordinate of the touch manipulation is detected in the manipulation position detector 116, and the position coordinate is input to the processor controller 111, the touch manipulation being detected (detected erroneously) on the basis of a change in the capacitance of the touch panel 101b due to the water drop 501 which is flowing down. After that, when the water drop 501 has flowed down from the icon D area 1011d to the outside of the manipulation detection area 1011, a release manipulation is detected (detected erroneously) and a position coordinate of the release manipulation is detected in the manipulation position detector 116, and the position coordinate is input to the processor controller 111, wherein the release manipulation is a manipulation to release the touch manipulation which was detected last time and is detected (detected erroneously) on the basis of a change in the capacitance of the touch panel 101b due to the water drop 501 which has flowed down to the outside of the manipulation detection area 1011. Then, the processor controller 111 performs a control that causes an operation corresponding to the icon D to be performed, because the position coordinate of a touch manipulation and the position coordinate of a release manipulation which are included in the icon D area 1011d are input, the release manipulation being a manipulation to release the touch manipulation. Thus, in this case, an erroneous operation is caused by an erroneous detection that occurs due to the water drop 501 flowing down as indicated by the route 502a.

The same applies to the case in which the water drop 501 flows down as indicated by the route 502b illustrated in FIG. 4A. Also in this case, when the water drop 501 has adhered to the icon A area 1011a, a touch manipulation is detected (detected erroneously) and a position coordinate of the touch manipulation is detected, and the position coordinate is input to the processor controller 111. After that, during the water drop 501 flowing down from the icon A area 1011a to the icon C area 1011c, the following processing is performed repeatedly: a touch manipulation is detected (detected erroneously) and a position coordinate of the touch manipulation is detected, and the position coordinate is input to the processor controller 111. After that, when the water drop 501 has flowed down from the icon C area 1011c to the outside of the manipulation detection area 1011, a release manipulation is detected (detected erroneously) and a position coordinate of the release manipulation is detected, and the position coordinate is input to the processor controller 111, the release manipulation being a manipulation to release the touch manipulation which was detected last time. Then, the processor controller 111 performs a control that causes an operation corresponding to the icon C to be performed, because the position coordinate of a touch manipulation and the position coordinate of a release manipulation which are included in the icon C area 1011c are input, the release manipulation being a manipulation to release the touch manipulation. Thus, also in this case, an erroneous operation is caused.

The same applies to the case in which the water drop 501 flows down as indicated by the route 502c illustrated in FIG. 4A. Also in this case, when the water drop 501 has adhered to the icon A area 1011a, a touch manipulation is detected (detected erroneously) and a position coordinate of the touch manipulation is detected, and the position coordinate is input to the processor controller 111. After that, during the water drop 501 flowing down through the icon A area 1011a, the following processing is performed repeatedly: a touch manipulation is detected (detected erroneously) and a position coordinate of the touch manipulation is detected, and the position coordinate is input to the processor controller 111. After that, when the water drop 501 has flowed down from the icon A area 1011a to the outside of the manipulation detection area 1011, a release manipulation is detected (detected erroneously) and a position coordinate of the release manipulation is detected, and the position coordinate is input to the processor controller 111, the release manipulation being a manipulation to release the touch manipulation which was detected last time. Then, the processor controller 111 performs a control that causes an operation corresponding to the icon A to be performed, because the position coordinate of a touch manipulation and the position coordinate of a release manipulation which are included in the icon A area 1011a are input, the release manipulation being a manipulation to release the touch manipulation. Thus, also in this case, an erroneous operation is caused.

As described above, in the case in which the valid detection area 1012 has not been set in the manipulation detection area 1011 (this is also the case of the conventional endoscopic processor), if the water drop 501 has flowed down from an icon area (such as the icon D area 1011d) that is situated in the margin of the manipulation detection area 1011 to the outside of the manipulation detection area 1011, an operation corresponding to the icon area is performed, so an erroneous operation is caused in the endoscopic processor 100.

Next, the operation of the endoscopic processor 100 when the valid detection area 1012 has been set in the manipulation detection area 1011 is described using FIG. 4B.

In the case in which the water drop 501 flows down as indicated by the route 502a illustrated in FIG. 4B, first, when the water drop 501 has adhered to the icon A area 1011a within the valid detection area 1012, a touch manipulation is detected (detected erroneously) and a position coordinate of the touch manipulation is detected in the manipulation position detector 116, the touch manipulation being detected (detected erroneously) on the basis of a change in the capacitance of the touch panel 101b due to the adhered water drop 501. Further, the position coordinate of the touch manipulation is included in the valid detection area 1012, so the position coordinate of the touch manipulation is determined to be valid in the filtering unit 117 and input to the processor controller 111. After that, during the water drop 501 flowing down from the icon A area 1011a to the icon D area 1011d within the valid detection area 1012, the following processing is performed repeatedly: a touch manipulation is detected (detected erroneously) and a position coordinate of the touch manipulation is detected in the manipulation position detector 116, the touch manipulation being detected (detected erroneously) on the basis of a change in the capacitance of the touch panel 101b due to the water drop 501 which is flowing down. Further, the position coordinate of the touch manipulation is included in the valid detection area 1012, so the position coordinate of the touch manipulation is determined to be valid in the filtering unit 117 and input to the processor controller 111. After that, during the water drop 501 flowing down through the icon D area 1011d outside of the valid detection area 1012, the following processing is performed repeatedly: a touch manipulation is detected (detected erroneously) and a position coordinate of the touch manipulation is detected in the manipulation position detector 116, the touch manipulation being detected (detected erroneously) on the basis of a change in the capacitance of the touch panel 101b due to the water drop 501 which is flowing down. However, the position coordinate of the touch manipulation is not included in the valid detection area 1012, so the position coordinate of the touch manipulation is determined to be invalid in the filtering unit 117 and is not input to the processor controller 111. After that, when the water drop 501 has flowed down from the icon D area 1011d outside of the valid detection area 1012 to the outside of the manipulation detection area 1011, a release manipulation is detected (detected erroneously) and a position coordinate of the release manipulation is detected in the manipulation position detector 116, wherein the release manipulation is a manipulation to release the touch manipulation which was detected last time and is detected (detected erroneously) on the basis of a change in the capacitance of the touch panel 101b due to the water drop 501 which has flowed down to the outside of the manipulation detection area 1011. However, the position coordinate of the release manipulation is not included in the valid detection area 1012, so the position coordinate of the release manipulation is determined to be invalid in the filtering unit 117 and is not input to the processor controller 111. Then, the processor controller 111 does not perform a control that causes an operation corresponding to an icon to be performed, because the position coordinate of a touch manipulation and the position coordinate of a release manipulation which are included in the same icon area are not input, the release manipulation being a manipulation to release the touch manipulation. In other words, the operation corresponding to the icon D described above using FIG. 4A is not performed. Thus, in this case, an erroneous operation is not caused by an erroneous detection that occurs due to the water drop 501 flowing down as indicated by the route 502a.

The same applies to the case in which the water drop 501 flows down as indicated by the route 502b illustrated in FIG. 4B. Also in this case, first, when the water drop 501 has adhered to the icon A area 1011a within the valid detection area 1012, a touch manipulation is detected (detected erroneously) and a position coordinate of the touch manipulation is detected, and the position coordinate of the touch manipulation is determined to be valid and input to the processor controller 111. After that, during the water drop 501 flowing down from the icon A area 1011a to the icon C area 1011c within the valid detection area 1012, the following processing is performed repeatedly: a touch manipulation is detected (detected erroneously) and a position coordinate of the touch manipulation is detected, and the position coordinate of the touch manipulation is determined to be valid and input to the processor controller 111. After that, during the water drop 501 flowing down through the icon C area 1011c outside of the valid detection area 1012, the following processing is performed repeatedly: a touch manipulation is detected (detected erroneously) and a position coordinate of the touch manipulation is detected, but the position coordinate of the touch manipulation is determined to be invalid and is not input to the processor controller 111. After that, when the water drop 501 has flowed down from the icon C area 1011c outside of the valid detection area 1012 to the outside of the manipulation detection area 1011, a release manipulation is detected (detected erroneously) and a position coordinate of the release manipulation is detected, but the position coordinate of the release manipulation is determined to be invalid and is not input to the processor controller 111, the release manipulation being a manipulation to release the touch manipulation which was detected last time. Then, the processor controller 111 does not perform a control that causes an operation corresponding to an icon to be performed, because the position coordinate of a touch manipulation and the position coordinate of a release manipulation which are included in the same icon area are not input, the release manipulation being a manipulation to release the touch manipulation. In other words, the operation corresponding to the icon C described above using FIG. 4A is not performed. Thus, also in this case, an erroneous operation is not caused.

The same applies to the case in which the water drop 501 flows down as indicated by the route 502c illustrated in FIG. 4B. Also in this case, first, when the water drop 501 has adhered to the icon A area 1011a within the valid detection area 1012, a touch manipulation is detected (detected erroneously) and a position coordinate of the touch manipulation is detected, and the position coordinate of the touch manipulation is determined to be valid and input to the processor controller 111. After that, during the water drop 501 flowing down through the icon A area 1011a within the valid detection area 1012, the following processing is performed repeatedly: a touch manipulation is detected (detected erroneously) and a position coordinate of the touch manipulation is detected, and the position coordinate of the touch manipulation is determined to be valid and input to the processor controller 111. After that, during the water drop 501 flowing down through the icon A area 1011a outside of the valid detection area 1012, the following processing is performed repeatedly: a touch manipulation is detected (detected erroneously) and a position coordinate of the touch manipulation is detected, but the position coordinate of the touch manipulation is determined to be invalid and is not input to the processor controller 111. After that, when the water drop 501 has flowed down from the icon A area 1011a outside of the valid detection area 1012 to the outside of the manipulation detection area 1011, a release manipulation is detected (detected erroneously) and a position coordinate of the release manipulation is detected, but the position coordinate of the release manipulation is determined to be invalid and is not input to the processor controller 111, the release manipulation being a manipulation to release the touch manipulation which was detected last time. Then, the processor controller 111 does not perform a control that causes an operation corresponding to an icon to be performed, because the position coordinate of a touch manipulation and the position coordinate of a release manipulation which are included in the same icon area are not input, the release manipulation being a manipulation to release the touch manipulation. In other words, the operation corresponding to the icon A described above using FIG. 4A is not performed. Thus, also in this case, an erroneous operation is not caused.

As described above, in the case in which the valid detection area 1012 has been set in the manipulation detection area 1011, even if the water drop 501 has flowed down from an icon area (such as the icon D area 1011*d*) that is situated in the margin of the manipulation detection area 1011 to the outside of the manipulation detection area 1011, an erroneous operation is not caused in the endoscopic processor 100.

The present embodiment makes it possible to prevent the endoscopic processor 100 from operating erroneously due to an erroneous detection that may occur due to a drop such as a water drop that has adhered to the capacitive touch panel 101*b*.

Various modifications may be made to the present embodiment.

Figure 5A:
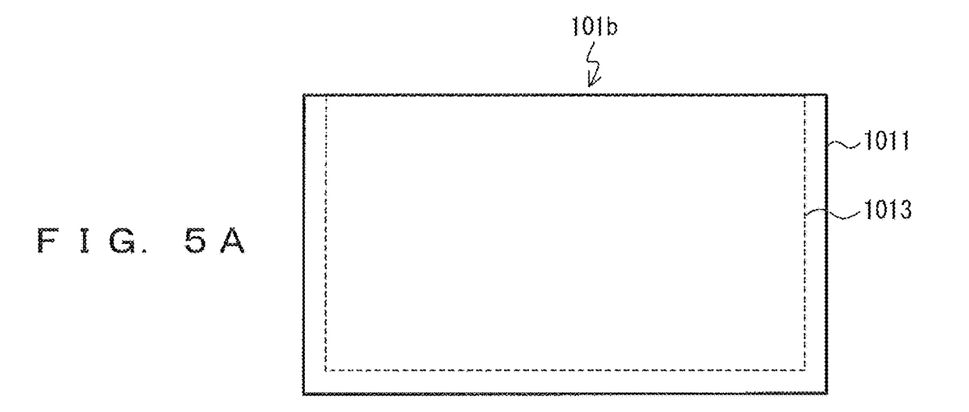
FIG. 5A is a first diagram that illustrates another example of the valid detection area set by the valid detection area setting unit in the manipulation detection area on the touch panel.
Figure 5B:
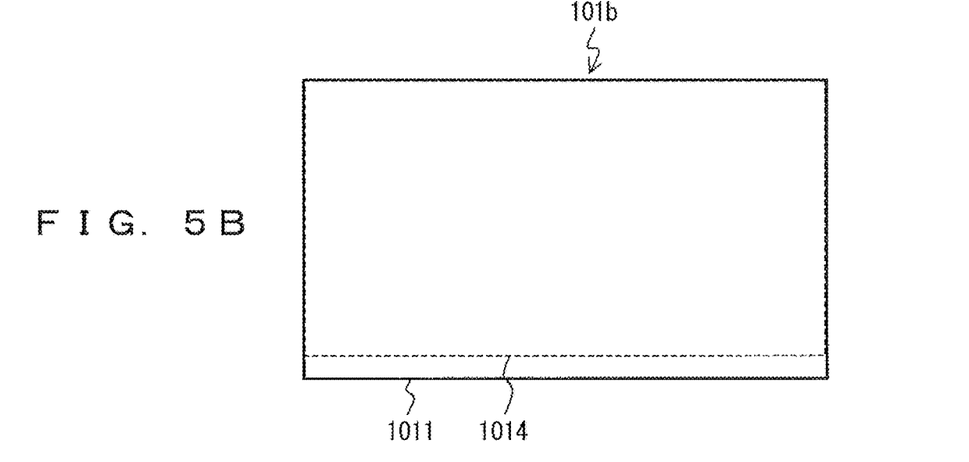
FIG. 5B is a second diagram that illustrates another example of the valid detection area set by the valid detection area setting unit in the manipulation detection area on the touch panel.
Figure 5C:
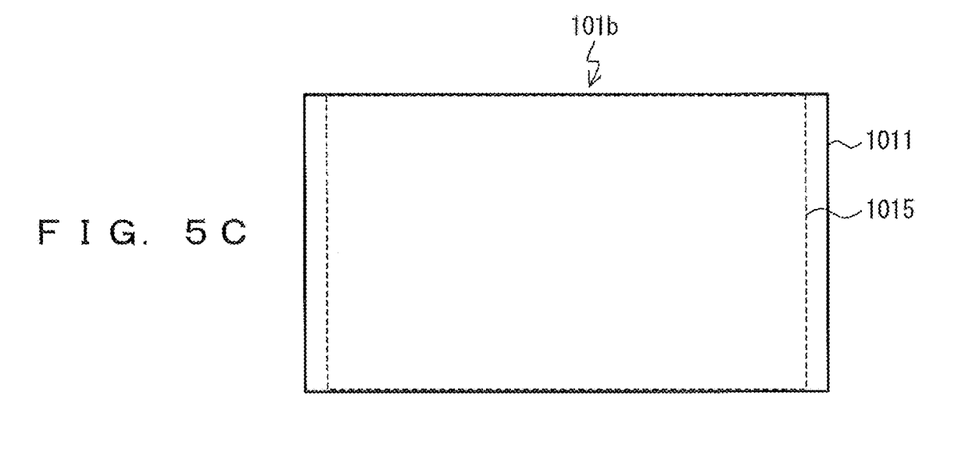
FIG. 5C is a third diagram that illustrates another example of the valid detection area set by the valid detection area setting unit in the manipulation detection area on the touch panel.

For example, the valid detection area setting unit 118 may set a valid detection area illustrated in FIG. 5A, 5B, or 5C. A valid detection area (an area surrounded by a dotted line) 1013 illustrated in FIG. 5A is an example in which an area other than a bottom marginal area and side marginal areas in the manipulation detection area 1011 on the touch panel 101*b* is set to be a valid detection area. According to this example, even if a water drop flows down as indicated by, for example, the route 502*a*, 502*b*, or 502*c* illustrated in FIG. 4A or 4B, an erroneous operation is not caused in the endoscopic processor 100. A valid detection area (an area surrounded by a dotted line) 1014 illustrated in FIG. 5B is an example in which an area other than a bottom marginal area in the manipulation detection area 1011 on the touch panel 101*b* is set to be a valid detection area. According to this example, even if a water drop flows down as indicated by, for example, the route 502*a* or 502*b* illustrated in FIG. 4A or 4B, an erroneous operation is not caused in the endoscopic processor 100. A valid detection area (an area surrounded by a dotted line) 1015 illustrated in FIG. 5C is an example in which an area other than side marginal areas in the manipulation detection area 1011 on the touch panel 101*b* is set to be a valid detection area. According to this example, even if a water drop has flowed down as indicated by, for example, the route 502*c* illustrated in FIG. 4A or 4B, an erroneous operation is not caused in the endoscopic processor 100.

For example, the endoscopic processor 100 may have a housing form having, on its front surface, a front panel that is provided perpendicularly (perpendicularly to its bottom surface), not inclined.

For example, the endoscopic system 400 is not limited to having the configuration described above, but, for example, it may be configured to further include an image recording device or the like, or it may be configured to be connected to a communication network.

In the present embodiment, the endoscopic processor 100 has been described as electronic equipment that includes a touch panel device, but the electronic equipment may be configured as electronic equipment other than the endoscopic processor 100.

The embodiments described above are just examples to facilitate understanding of the present invention, and the invention is not limited to these embodiments. Various modifications and alterations may be made hereto without departing from the spirit of the invention specified in the claims.

What is claimed is:
1. A touch panel device comprising:
a housing device that includes a front panel provided on a side surface thereof;
a capacitive touch panel that is provided on the front panel;
a manipulation detector that detects a touch manipulation when a water drop has adhered to a manipulation detection area on the touch panel, and detects a release manipulation that is a manipulation to release the touch manipulation when the water drop has flowed down to outside of the manipulation detection area, on the basis of a change in the capacitance of the touch panel;
a manipulation valid area setting unit that sets an area other than a margin on the side of a floor of the housing device in the manipulation detection area to be a manipulation valid area in which a manipulation detected by the manipulation detector is determined to be valid; and
a filtering unit, wherein after the touch manipulation has been detected by the manipulation detector in the manipulation detection area, the filtering unit determines that the release manipulation is valid when the release manipulation has been detected within the manipulation valid area, and determines that the release manipulation is invalid when the release manipulation has been detected outside of the manipulation valid area.

2. The touch panel device according to claim 1, wherein the manipulation detector includes
a touch coordinate detector that detects a coordinate of a position, in the manipulation detection area, at which a touch manipulation performed on the manipulation detection area has been detected on the basis of a change in the capacitance of the touch panel, and
a release coordinate detector that detects a coordinate of a position, in the manipulation detection area, at which a release manipulation has been detected on the basis of a change in the capacitance of the touch panel, the release manipulation being a manipulation to release the touch manipulation performed on the manipulation detection area; and
the filtering unit determines that the manipulation detected by the manipulation detector is invalid when the coordinate detected by the release coordinate detector is situated outside of the manipulation valid area.

3. The touch panel device according to claim 1, wherein the manipulation valid area is an area other than side marginal areas in the manipulation detection area.

4. A touch panel device comprising:
a housing device that includes a front panel provided on a side surface of the housing device;
a capacitive touch panel that is provided on the front panel;
a manipulation detector configured to: (a) detect a touch manipulation when a water drop has adhered to a manipulation detection area on the capacitive touch panel, and (b) detect a release manipulation that is a manipulation to release the touch manipulation when the water drop has flowed outside of the manipulation detection area, based on a change in a capacitance of the capacitive touch panel;

at least one controller programmed to:
set an area other than a margin on a side of a floor of the housing device in the manipulation detection area as a manipulation valid area for determining whether a manipulation on the capacitive touch panel is valid; and in response to the touch manipulation being detected in the manipulation detection area: (1) determine that the release manipulation is valid when the release manipulation is detected within the manipulation valid area, and (2) determine that the release manipulation is invalid when the release manipulation is detected outside of the manipulation valid area.

5. The touch panel device according to claim 4, wherein the at least one controller is further programmed to:
detect a first coordinate of a position, in the manipulation detection area, at which a touch manipulation performed on the manipulation detection area is detected based on a change in the capacitance of the capacitive touch panel;

detect a second coordinate of a position, in the manipulation detection area, at which a release manipulation is detected based on a change in the capacitance of the capacitive touch panel, the release manipulation being a manipulation to release the touch manipulation performed on the manipulation detection area; and determine that the detected manipulation is invalid when the coordinate detected by the release coordinate detector is disposed outside of the manipulation valid area.

6. The touch panel device according to claim 4, wherein the manipulation valid area is an area other than side marginal areas in the manipulation detection area.

\* \* \* \* \*